United States Patent [19]

Rasoul et al.

[11] Patent Number: 5,391,624
[45] Date of Patent: Feb. 21, 1995

[54] THERMOSETTABLE COMPOSITIONS

[75] Inventors: Husam A. A. Rasoul, Caledonia; James R. Beam, Somers, both of Wis.

[73] Assignee: S. C. Johnson & Son, Inc., Racine, Wis.

[21] Appl. No.: 857,366

[22] Filed: Mar. 25, 1992

Related U.S. Application Data

[63] Continuation-in-part of Ser. No. 833,250, Feb. 10, 1992.

[51] Int. Cl.$^6$ ............... C08L 29/00; C08L 45/00
[52] U.S. Cl. .................... 525/216; 524/522; 525/220; 525/221
[58] Field of Search ............ 524/522, 558; 525/216, 525/220, 221

[56] References Cited

U.S. PATENT DOCUMENTS

| | | | |
|---|---|---|---|
| 2,984,588 | 5/1961 | Graulich | 117/161 |
| 3,535,291 | 10/1970 | Riemhofer | 260/78.5 |
| 3,554,987 | 1/1971 | Smith | 260/79.3 |
| 3,668,183 | 6/1972 | Hoy | 260/65 |
| 3,832,217 | 8/1974 | Sato | 117/74 |
| 3,981,985 | 9/1976 | Roberts | 427/43 |
| 4,144,208 | 3/1979 | Fuchs et al. | 260/27 R |
| 4,218,498 | 8/1980 | Cohen | 427/336 |
| 4,251,597 | 2/1981 | Emmons | 428/500 |
| 4,258,079 | 3/1981 | Economy | 427/44 |
| 4,268,547 | 5/1981 | Backhouse | 427/385.5 |

(List continued on next page.)

FOREIGN PATENT DOCUMENTS

| | | |
|---|---|---|
| 0326723A1 | 8/1989 | European Pat. Off. . |
| 0341886A2 | 11/1989 | European Pat. Off. . |
| 0390370A1 | 2/1990 | European Pat. Off. . |
| 2535372A1 | 2/1977 | Germany . |

OTHER PUBLICATIONS

Textbook of Polymer Science (Second Edition) published by John Wiley and Sons, Inc.

Textbook of Polymer Science (Third Edition) published by John Wiley & Sons.
The Condensed Chemical Dictionary (Tenth Edition) published by Van Nostrand Reinhold Company.
Applications for the Acetoacetyl Functionality in Thermoset Coatings by F. Del Rector, W. W. Blount and D. R. Leonard.
Principles of Polymerization (Second Edition) by George Odian published by John Wiley & Sons.

*Primary Examiner*—Judy M. Reddick
*Attorney, Agent, or Firm*—Richard E. Rakoczy; J. William Frank, III

[57] ABSTRACT

A novel thermosettable composition-of-matter is disclosed. One embodiment of the composition-of-matter includes a polymeric thermosettable ingredient having at least three acetoacetoxy-type functional pendant moieties as well as at least three acid-functional pendant moieties. Another embodiment of the composition-of-matter includes at least two polymeric thermosettable ingredients, one of which includes at least three acid-functional pendant moieties and the other of which includes at least three acetoacetoxy-type functional pendant moieties. The novel composition is characterized in that the acid-functional and acetoacetoxy-type functional pendant moieties crosslinkably-react together, when subjected to elevated-temperature conditions for a predetermined period of time, thereby producing a crosslinked polymeric network. The novel thermosettable composition-of-matter can be used "as is" if either of the polymeric thermosettable components is a "fluid" (i.e., is able to flow) at room temperature. Otherwise, the novel thermosettable composition-of-matter may be formulated into a solvent-borne coating composition, a water-borne coating composition, or a powder coating composition.

4 Claims, No Drawings

U.S. PATENT DOCUMENTS

| | | | |
|---|---|---|---|
| 4,293,600 | 10/1981 | Fink | 427/385.5 |
| 4,342,815 | 8/1982 | Doehnert | 428/522 |
| 4,408,018 | 10/1983 | Bartman | 525/300 |
| 4,487,789 | 12/1984 | Iwanami | 427/407.1 |
| 4,505,981 | 3/1985 | Geist | 428/418 |
| 4,523,003 | 6/1985 | Bezwada | 528/58 |
| 4,547,409 | 10/1985 | Geist | 427/386 |
| 4,631,320 | 12/1986 | Parekh | 525/452 |
| 4,661,410 | 4/1987 | Geist | 428/418 |
| 4,751,263 | 6/1988 | Domeier et al. | 524/558 X |
| 4,772,491 | 9/1988 | Nealy | 427/336 |
| 4,772,680 | 9/1988 | Noomen | 528/229 |
| 4,830,803 | 5/1989 | Matsumaru | 264/135 |
| 4,855,349 | 8/1989 | Ingle | 524/558 X |
| 4,906,684 | 3/1990 | Say | 524/548 |
| 4,908,403 | 3/1990 | Spada et al. | 524/818 |
| 4,970,096 | 11/1990 | Reitberg | 427/340 |
| 4,975,481 | 12/1990 | Tamm et al. | 524/522 X |
| 5,070,136 | 12/1991 | Dersch et al. | 524/555 |
| 5,122,567 | 6/1992 | Spada et al. | 524/818 |
| 5,157,071 | 10/1992 | Ingle | 524/558 X |
| 5,185,212 | 3/1993 | Spada et al. | 428/483 |
| 5,202,375 | 4/1993 | Biale | 524/562 |

THERMOSETTABLE COMPOSITIONS

Reference to Related Application

This is a continuation-in-part of U.S. application Ser. No. 07/833,250, filed 10 Feb. 1992, the benefit of which filing date is now claimed for priority purposes pursuant to 35 USC § 120.

TECHNICAL FIELD

Our present invention is directed to novel thermosettable compositions-of-matter.

One embodiment of our composition-of-matter includes at least one thermosettable ingredient having both acetoacetoxy-type functional pendant moieties as well as acid-functional pendant moieties. Another embodiment of our composition-of-matter includes two or more thermosettable ingredients, one of which includes acid-functional pendant moieties and the other of which includes acetoacetoxy-type functional pendant moieties.

Still another aspect or feature of our present invention is directed to methods of producing the various embodiments of our novel thermosettable compositions-of-matter.

Yet another preferred aspect or feature of our present invention is directed to various methods of applying our thermosettable compositions-of-matter, as a coating, onto a suitable substrate surface, and thereafter supplying or applying an effective amount of heat to the substrate-applied coating, for purposes of producing a crosslinked surface coating on the substrate.

BACKGROUND ART

*Thermosetting resins* are polymeric materials that can be observed, under the influence of heat, to irreversibly change physically, from a fusible and/or soluble polymeric material into an "intractable" (that is, an infusible and insoluble) polymeric material, through the formation of a covalently-crosslinked, generally thermally-stable polymeric network.

Various well-known thermosetting resins include phenolic and amino resins; unsaturated polyester resins; epoxy resins and polyurethanes; and silicone polymers. Other well-known thermosetting resins include alkyd resins, allyl resins, and furane resin. (See, for example, pages 436–454 and 480 of a book entitled *Textbook Of Polymer Science*, third edition, by Fred W. Billmeyer, Jr., published in 1984 by John Wiley & Sons, Inc.; see also pages 468–488 of the second edition of the above-identified Billmeyer text, published in 1971.)

Additionally, polyimides have recently been employed in the manufacture of certain thermosettable formulations. (See, e.g., the third edition of the above-identified Billmeyer textbook at page 428.)

It was in February of 1988, when F. Del Rector et al. (three authors in total) presented in New Orleans, La., of the United States of America, a technical paper entitled *Applications For The Acetoacetyl Functionality In Thermoset Coatings*. Briefly stated, these three authors reviewed some of the many, then-known methods for incorporating certain so-called "activated methylene" groups into different types or classes of resins, for purposes of preparing certain polymeric thermoset surface coatings and films, via a number of then-known crosslinking mechanisms.

More particularly, these three authors discussed various well-known methods of reacting certain acetoacetyl-functional moiety-containing polymers with certain melamines, certain isocyanates, certain aldehydes, certain diamines, and certain other specified reactants via the so-called Michael reaction, to achieve desired crosslinking of the acetoacetyl-functional moiety. For example, U.S. Pat. No. 4,408,018 to Bartman et al. notes that the reaction of acetoacetic ester with acrylic acid ester in the presence of a strong base is illustrative of the Michael reaction.

However, use of a strong base may either be undesirable or impractical. For example, current governmental regulation may impose certain substantial "use" restrictions upon such ingredients as melamines, isocyanates, and aldehydes.

Additionally, while a great many of the commonly-known polymeric thermosetting compositions are known to contain so-called aminoplasts—such as metholated melamines, isocyanates or epoxides—as crosslinking agents, there are various problems associated with certain uses of each of these crosslinking agents. For instance, the aminoplasts in general require baking conditions to effect cure; and during the baking step, aminoplasts often evolve formaldehyde or other toxic volatile products or by-products. Isocyanates, too, are known to have certain toxic effects. Further in that regard, epoxide-crosslinked systems, in general, tend to deteriorate upon being subjected to outdoor exposure. The conventionally-employed alkyd systems, moreover, are known to have relatively poor weatherability properties.

Various societal, economic and governmental pressures thus tend to mandate a non-toxic, inexpensive crosslinking system for use in the coatings industries, the textiles industries, the plastics industries, and other industries.

One of our colleagues (Richard Esser) has recently discovered that crosslinkable surface coatings can be made from polymeric compositions-of-matter or formulations that include certain acetoacetoxy-type functional pendant moieties, certain acid-functional pendant moieties and, necessarily, certain non-polymeric polyfunctional amines.

However, in the manufacture of thermosettable polymeric formulations including acetoacetoxy-type functional pendant moieties it may be desirable to avoid use of amines entirely.

Additional prior-art references, reviewed by us, that disclose various known reaction mechanisms for utilization of acetoacetoxy-type functional pendant moieties include U.S. Pat. No. 3,535,291 to Riemhofer et al.; U.S. Pat. No. 3,668,183 to Hoy et al.; U.S. Pat. Nos. 4,505,981 and 4,547,409 and 4,661,410, all to Geist; U.S. Pat. No. 4,772,680 to Noomen et al.; European Patent Application No. 0 326 723/A1 (assigned to Rohm & Haas Co.); European Pat. Application No. 0 341 886/A2 (assigned to ICI Resins BV); and European Pat. Application No. 0 390 370/A1 (assigned to Imperial Chemical Industries PL and ICI Resins BV).

Yet, in all the prior-art references reviewed by us, there is no disclosure—or even a suggestion—that the combination of acetoacetoxy-type functional pendant moieties and acid-functional pendant moieties, in the absence of crosslinking agents, might be able to be employed in the manufacture of useful thermosettable compositions.

SUMMARY DISCLOSURE OF INVENTION

Accordingly, we have discovered—surprisingly—that a novel thermosettable composition can be made without amines or any other traditional crosslinking ingredient.

As a result of our discovery, we characterize our novel compositions as "self-crosslinkable", meaning that certain moieties crosslinkably react, at elevated temperature, with certain other crosslinkably-reactive moieties, wherein both such moieties are included within our novel composition.

Briefly, our novel composition-of-matter comprises a polymeric thermosettable ingredient providing acetoacetoxy-type and acid-functional pendant moieties.

In particular, in one embodiment of our novel composition, such a polymeric thermosettable ingredient is characterized as having both acetoacetoxy-type and acid-functional pendant moieties. In another embodiment of our composition-of-matter, one such polymeric thermosettable ingredient includes acid-functional pendant moieties and another such polymeric thermosettable ingredient includes acetoacetoxy-type functional pendant moieties. Polymeric ingredients of these sorts can be prepared as a solution, as an emulsion, or via bulk polymerization methods. When preparation of polymeric ingredients of these sorts includes a liquid carrier, the polymeric ingredient, after being separated from its liquid carrier, is occasionally referred to throughout this patent specification as a polymer or, occasionally, as a "resin".

Accordingly, our novel thermosettable composition-of-matter may be formulated into a solvent-borne coating composition, a water-borne coating composition, or a so-called "powder" coating composition.

For example, a solvent-borne coating composition that embodies certain principles of our present invention can be prepared by combining effective relative amounts of solvent, pigment, leveling aid and resin, for purposes of achieving a desired "polymer solids" level and/or viscosity value for the thus-produced coating composition. (An equivalent expression for "polymer solids" throughout this patent specification is "percent non-volatiles", abbreviated "% NV".)

Water-borne coating compositions, similarly embodying certain principles of our present invention, can be prepared by combining effective relative amounts of coalescent, pigment, leveling aid and resin, to achieve a desired "polymer solids" level and/or viscosity for the thus-produced water-borne coating composition.

Powder coating compositions can be prepared by melt-blending the pigment, resin, and leveling aids, and subsequently grinding the blend into a powder.

Such coating compositions can be applied to a suitable substrate using an appropriate method of application.

With respect to the coating compositions that are based upon solvent, water or both, the volatile ingredients of such a composition are typically allowed to evaporate, either at room-temperature or at elevated-temperature conditions. In this regard, in the formulation of coating compositions which include volatile liquid carriers that are based upon water, solvent or both, an important consideration in choosing a particular volatile liquid carrier may be its boiling point range; and suitable liquid carriers may thus include various hydrocarbons and/or hydrocarbon mixtures. Accordingly, because certain hydrocarbon mixtures such as oxygenated hydrocarbon solvents may include water, there are various formulation embodiments of our invention which may take the form of "solutions", while various other formulation embodiments of our invention may take the form of "dispersions", "latexes", or "emulsions".

Until evaporation of the liquid carrier portion of such formulation embodiments of our invention occurs, the crosslinkably-reactive moieties contained within any such formulation will not crosslink. In particular, we have found it desirable to have evaporation of the liquid carrier occur at elevated temperature and, as a result, such formulation embodiments of our invention have an indefinite shelf-life when stored at room temperature. To achieve such a result, we have found it desirable for the liquid carrier to have a boiling point range of from 70 degrees Celsius to 230° C., preferably from 100° C. to 220° C., more preferably from 130° C. to 210° C., and most preferably from 140° to 200° C.

Powder coating compositions embodying principles of our present invention would, of course, not require a volatile liquid carrier. Nor would coating compositions that e.g. include viscous, liquid polymeric thermosettable ingredients that embody principles of our present invention.

One general principle of our present invention is that each polymeric thermosettable ingredient containing the acetoacetoxy-type and acid-functional pendant moieties is so produced, such that crosslinking as between the crosslinkably-reactive moieties occurs only after the temperature of such an ingredient is heated to at least 180° C., preferably above 200° C.

Crosslinking, as between each other, of the above-noted crosslinkably-reactive pendant moieties thus results in the production of a thermoset composition.

INDUSTRIAL APPLICABILITY

It is to be understood that the physical properties of any such thermoset composition (product) embodying principles of our present invention will often be governed by certain physical properties of the starting ingredients, namely, the crosslinkably-reactable thermosettable ingredients. For example, the acid number, the glass-transition temperature, and the number-average and/or weight-average molecular weight of a particular polymeric thermosettable ingredient may affect certain physical properties of a particular thermoset composition (product), as a result of certain crosslinking taking place. Thus, our novel thermosettable composition will typically have a wide assortment of uses, depending upon the physical properties of the particular, crosslinked product that is ultimately produced.

In particular, certain embodiments of the thermosettable composition of our invention may be useful as decorative laminates for residential and restaurant counter tops, and industrial laminates for various commercial electrical components.

Still other embodiments of the thermosettable composition of our invention may be useful as general purpose surface coatings for boat hulls; impact-resistant surface coatings for various automotive parts; and decorative surface coatings for various consumer products including luggage, chairs and tables.

Yet other embodiments of the thermosettable composition of our invention will be useful as surface coatings for pipe and ductwork, and coatings for various home-use appliances.

BEST MODE FOR CARRYING OUT THE INVENTION

While our present invention is susceptible to embodiment in various forms, there is hereinbelow described in detail several presently preferred embodiments of our invention, with the understanding that the present disclosure is to be considered as merely an exemplification of our present invention, without limitation to the specific embodiments or examples discussed or otherwise disclosed.

In the ensuing detailed description, certain terms as well as certain terminology (generally known by those skilled in the art) will be utilized for purposes of conciseness, and for otherwise elucidating the features and advantages of our present invention. Such terms are defined as follows.

The term "acid number" indicates the milligrams ("mg.") of potassium hydroxide ("KOH") required to neutralize one gram ("g.") of a particular initially-acidic polymeric or monomeric ingredient.

The term "addition polymerization" relates to certain polymer chain-forming reactions, wherein the agent that is utilized to effect formation of the polymer chain is an ionic species or another suitably-reactive substance with either of these having at least one unpaired electron that is able to function as a "free radical". A free radical is, broadly speaking, a species that is capable of reacting in a manner so as to (1) open the double bond of an ethylenically-unsaturated monomer and (2) attach itself to such monomer at the double bond thereof, thereby causing a polymer chain to begin growing, thus leaving an unpaired electron which, in turn, can function as the subsequent free radical species to further propagate the chain. Typically, and in a relatively short period of time (e.g., usually a few seconds or less), several monomer units can successively add to the thus-growing polymer chain (via the double-bond-opening mechanism described immediately above). Finally, two of the hereinabove-described "free radical" species react with each other in a manner so as to terminate their mutual growth activity, thereby forming one or more polymer molecules. The term "addition polymerization" thus contemplates discrete "initiation", "propagation" and "termination" steps.

"Condensation polymerization" is a type of chemical reaction, wherein two or more crosslinkably-reactable molecules combine to produce a larger molecule, generally with the production of a relatively small by-product molecule such as water, alcohol, or another substance of relatively "simple" chemical structure.

The term "dispersion" is understood to connote a two-phase system of which one phase consists of finely-divided particles, often in the colloidal-size range, distributed throughout a "bulk" substance, wherein such finely-divided particles provide the "disperse" or internal phase and the bulk substance provides the "continuous" or external phase.

The term "elevated temperature" as used herein means any temperature greater than room temperature.

The term "emulsion" is understood by those skilled in the art as involving a stable mixture of two or more immiscible liquids, often held in suspension by small percentages of substances called "emulsifiers" (also called "surfactants" or "soaps"). All emulsions are known to include both a continuous phase as well as a discontinuous phase that is dispersed throughout the continuous phase.

The term "emulsion polymerization" is understood by those skilled in the art as involving the polymerization of monomers in aqueous media to form dispersed polymers having particle diameters in the range of approximately 20 to 1000 nm. ($10^9$ nanometers ("nm.") are equivalent to one meter.)

The term "glass-transition temperature" is understood by those skilled in the polymer chemistry field as representing the temperature at which the amorphous domains of a polymer assume the characteristic properties of the so-called "glassy" state, wherein such polymeric glassy-state properties include brittleness, stiffness, and rigidity.

The term "latex" is understood to refer to the product of a particular emulsion-polymerization reaction. In that regard, the term "latex" is typically understood to mean an aqueous or water-based polymer emulsion, without separation of the polymer product from the aqueous carrier (e.g., water) which may include other liquid as well as certain by-product components within the emulsion.

The term "monomer" as it is used throughout this patent specification is hereby understood to mean a particular polymerizable starting material from which a particular polymer can be formed via addition and/or condensation polymerization reactions.

The term "pendant moiety", in conjunction with chemical structure, is understood to mean a moiety which is attached to a particular monomer or polymer molecule. Moreover, the term "pendant moiety" as used herein includes end groups.

The term "polymer" as used herein means a particular type of macromolecule that is formed by the chemical union of monomeric units. In particular, the term "polymer" as used herein shall be understood to mean a macromolecule having at least three of the same type of chemically-reactive pendant moieties. Thus, a maceomolecule having at least three acid-functional pendant moieties or at least three acetoacetoxy-type functional pendant moieties is herein referred to as a polymeric ingredient. Such polymeric ingredients are themselves additionally polymerizable in accordance with certain principles of our present invention.

The term "room temperature" shall be understood to mean a temperature of from 20 degrees Celsius to 25° C.

A number of additional terms are defined throughout the body of this patent specification.

As was mentioned above, our novel composition comprises polymeric thermosettable ingredients providing acetoacetoxy-type and acid-functional pendant moieties.

In this regard, in one particular embodiment of our novel composition, such a polymeric thermosettable ingredient is characterized as having an average of at least three acetoacetoxy-type functional pendant moieties and an average of at least three acid-functional pendant moieties per polymer molecule.

In yet another embodiment of our novel composition, one particular polymeric thermosettable ingredient includes an average of at least three acid-functional pendant moieties per polymer molecule, and another such polymeric thermosettable ingredient includes an average of at least three acetoacetoxy-type functional pendant moieties per such polymer molecule.

Further in this regard, a polymeric ingredient having an average of at least three acetoacetoxy-type functional pendant moieties per polymer molecule, in accordance with our present invention, may be prepared by copolymerizing acetoacetoxy-type functional monomers with other optional monomers using various solution, emulsion, or bulk polymerization methods. Suitable acetoacetoxy-type monomers may be represented by the following structure.

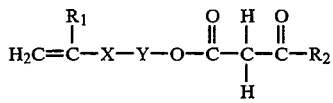

wherein $R_1$ is either H or is a $C_1$ to $C_{10}$ alkyl group;
wherein $R_2$ is a $C_1$ to $C_{10}$ alkyl group;
wherein "X" is either non-existent or is

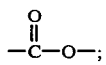

wherein "Y" is either non-existent, or is a divalent aromatic group, or is a divalent aliphatic cyclic group, or is $-(CH_2)_j-$ and "j" is the integer 1-10 inclusive, or is $-(CH_2-CHR_1-O)_m-CH_2-CHR_1-$ wherein Y is existent when X is

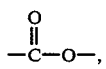

and "m" is either zero or is the integer 1-9 inclusive.

Such a polymeric ingredient having an average of at least three acid-type functional pendant moieties per polymer molecule, in accordance with our present invention, may be prepared by copolymerizing acid-type functional monomers with certain other optional monomers using various solution, emulsion, or bulk polymerization methods. Suitable acid-type monomers may be represented by the following structure.

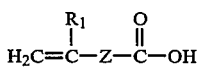

wherein $R_1$ is as defined above;
wherein "Z" is either non-existent, or is a divalent aromatic group, or is a divalent aliphatic cyclic group, or may be represented by the structure—$(CH_2-)_k$ wherein "k" is the integer 1-10 inclusive.

Preferred acetoacetoxy-type functional moiety-containing monomers for purposes of our present invention include acetoacetoxyethyl methacrylate ("AAEM"); acetoacetoxyethyl acrylate ("AAEA"); allyl acetoacetate; vinyl acetoacetate; and combinations thereof.

AAEM is structurally represented as:

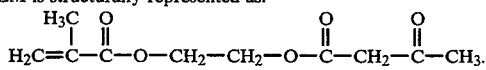

AAEA is structurally represented as:

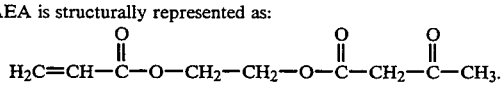

Allyl acetoacetate is structurally represented as:

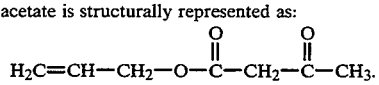

Vinyl acetoacetate is structurally represented as:

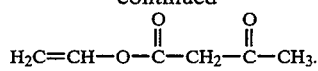

Particularly preferred acetoacetoxy-type functional moiety-containing monomers are acetoacetoxyethyl methacrylate ("AAEM"), acetoacetoxyethyl acrylate ("AAEA"), and various combinations thereof.

Acid moiety-containing monomers suitable for purposes of our invention include but are not limited to ethacrylic acid, acrylic acid ("AA"), fumaric acid-monoethyl ester, fumaric acid, itaconic acid, maleic acid, methacrylic acid ("MAA"), fumaric acid-monomethyl ester, methyl hydrogen maleate, and combinations thereof.

Preferred acid moiety-containing monomer is selected from the group consisting of acrylic acid ("AA"), methacrylic acid ("MAA"), and combinations thereof.

In those instances where a particular polymeric ingredient is to include an average of at least three acetoacetoxy-type pendant moieties as well as an average of at least three acid-functional pendant moieties per polymer molecule, then such a polymeric ingredient may be prepared by copolymerizing the above-mentioned types of monomers (i.e., those monomers containing acetoacetoxy-type and acid-type functional pendant moieties) along with certain other "optional" monomers (if desired), using various solution, emulsion, or bulk polymerization methods.

In this regard, suitable optional monomers that may be used in the preparation of our novel thermosettable compositions might include a monomeric acrylic or methacrylic acid ester or a monomeric alkene (such as ethylene) or a vinylic monomer or polymer, provided that any such additional (optional) ingredient is addition-polymerizable with the acetoacetoxy-type functional moiety-containing and acid moiety-containing thermosettable ingredients that are utilized to produce the resulting thermoset product.

Examples of suitable acrylic and methacrylic acid esters include but are not limited to methyl acrylate ("MA"), methyl methacrylate ("MMA"), ethyl acrylate, ethyl methacrylate, propyl acrylate, propyl methacrylate, butyl acrylate ("BA"), butyl methacrylate, 2-ethyl hexyl acrylate ("2-EHA"), 2-ethyl hexyl methacrylate, decyl acrylate, decyl methacrylate, hydroxyethyl acrylate, hydroxyethyl methacrylate ("HEMA"), hydroxypropyl acrylate, hydroxypropyl methacrylate, and combinations thereof.

Suitable vinyl monomers include but are not limited to 1,2-butadiene; 1,3-butadiene; chloroprene; 1,3,5-hexatriene; styrene ("St"); alpha-methyl styrene ("AMS"); vinyl acetate; vinyl chloride ("VCl"); vinyl toluene; vinylidene chloride; and various combinations thereof.

In that particular embodiment of our present invention wherein the polymeric thermosettable ingredient has at least three acetoacetoxy-type functional pendant moieties as well as at least three acid-functional pendant moieties, such will have a number-average molecular weight ("Mn") of more than 1750, preferably more than 3000, more preferably more than 3500, and most preferably more than 4000.

As was noted above, our novel thermosettable composition-of-matter can be used "as is" if the thermosettable components are a "fluid" (i.e., are able to flow) at room temperature.

Otherwise, our novel thermosettable composition-of-matter may be formulated into a solvent-borne coating composition, a water-borne coating composition, or a so-called "powder" coating composition.

For example, a solvent-borne coating composition that embodies certain principles of our present invention can be prepared by combining effective relative amounts of solvent, pigment, leveling aid and resin, for purposes of achieving a desired "polymer solids" level and/or viscosity value for the thus-produced coating composition. Further in that regard, water-borne coating compositions, similarly embodying certain principles of our present invention, can be prepared by combining effective relative amounts of coalescent, pigment, leveling aid and resin, to achieve a desired "polymer solids" level and/or viscosity for the thus-produced water-borne coating composition. And powder coating compositions can be prepared by melt-blending the pigment, resin, and leveling aids, and subsequently grinding the blend into a powder.

Such coating compositions can be applied to a suitable substrate using an appropriate method of application.

With respect to the coating compositions that are based upon solvent, water or both, the volatile ingredients of such a composition are typically allowed to evaporate, either at room-temperature or at elevated-temperature conditions. In that regard, in the formulation of coating compositions which include volatile liquid carriers that are based upon water, solvent or both, an important consideration in choosing a particular volatile liquid carrier may be its boiling point range; and suitable liquid carriers may thus include various oxygenated hydrocarbon solvents and/or hydrocarbon mixtures.

Accordingly, because certain ones of such hydrocarbon solvents or mixtures may include water, there are various formulation embodiments of our invention which may take the form of "solutions", while various other formulation embodiments of our invention may take the form of "dispersions", "latexes", or "emulsions".

In any event, until evaporation of the liquid carrier portion of such formulation embodiments of our invention occurs, the crosslinkably-reactive moieties contained within any such formulation will not crosslink. In particular, we have found it desirable to have evaporation of the liquid carrier occur at elevated temperature and, as a result, such formulation embodiments of our invention have an indefinite shelf-life when stored at room temperature. To achieve such a result, we have found it desirable for the liquid carrier to have a boiling point range of from 70 degrees Celsius to 230° C., preferably from 100° C. to 220° C., more preferably from 130° C. to 210° C., and most preferably from 140° C. to 200° C.

In this regard, suitable oxygenated hydrocarbon solvents and/or mixtures in accordance with our present invention include various $C_5$ to $C_9$ alcohols including diols, triols and so forth; certain thiols and mercaptans; cyclohexanone; toluene; methyl isobutyl ketone ("MIBK"); tetrahydrofuran ("THF"); 1,3-dioxane; 1,4-dioxane; acetone; ethyl acetate; hexane; ethyl benzene ("ETB"); diethyl "carbitol"; dimethyl "carbitol"; diethyl "cellosolve"; "cellosolve" acetate ("CSA"); glycol dimethyl ether ("glyme"); diglycol methyl ether ("diglyme"); triglyme; methyl amyl ketone ("MAK"); ethoxy ethyl acetate; xylene; methyl ethyl ketone ("MEK"); propylene glycol monomethyl ether acetate ("PM acetate"); ethoxy ethyl acetate; and the like; and mixtures thereof.

"Carbitol" and "Cellosolve" are trademarks (both owned by Union Carbide Corp. of New York, N.Y., U.S.A.) for a group of mono-alkyl and di-alkyl ethers of diethylene and ethylene glycol, respectively, as well as their derivatives. (See, e.g., pages 193 and 208–209, respectively, as well as 1127 and 1135 of a textbook entitled *The Condensed Chemical Dictionary*, tenth edition, revised by G. G. Hawley, published in 1981 by Van Nostrand Reinhold Company, Inc.)

Preferred solvents include methyl amyl ketone, xylene, PM acetate, toluene, "cellosolve" acetate, ethoxy ethyl acetate, ethyl benzene, diethyl "cellosolve", and mixtures thereof. The more preferred hydrocarbon solvents include methyl amyl ketone, xylene, "cellosolve" acetate, PM acetate, and mixtures thereof.

Water-borne coating formulations may be prepared by combining with a suitable coalescent ingredient or coalescent mixture, a suitable polymeric thickener, a suitable leveling aid, a suitable plasticizer, a suitable pigment, and other suitable additives. As noted above, a suitable hydrocarbon solvent or hydrocarbon solvent mixture may—at certain times—be combined with water to produce a particular volatile liquid carrier. In certain other embodiments, however, a particular suitable volatile liquid carrier might not include water.

Powder coating compositions embodying principles of our present invention would, of course, not require a volatile liquid carrier. Nor would coating compositions that e.g. include viscous, liquid polymeric thermosettable ingredients that embody principles of our present invention.

Powder coating formulations can be prepared by grinding or otherwise combining (1) a polymeric thermosettable ingredient having at least three acetoacetoxy-type pendant moieties with (2) a polymeric thermosettable ingredient having at least three acid-functional pendant moieties, as described above, together with a suitable polymeric or monomeric flow-modifying ingredient, a suitable pigment, and certain other ingredients such as suitable additives.

One general principle of our present invention is that each such polymeric thermosettable ingredient containing acetoacetoxy-type and/or acid-functional pendant moieties is so produced, such that crosslinking as between the crosslinkably-reactive moieties occurs only after the temperature of any such ingredient is heated to at least 180° C., preferably above 200° C. (The acid-functional and acetoacetoxy-type moieties are characterized as "crosslinkably-reactive" because an acid-functional moiety crosslinks by reacting with an acetoacetoxy-type moiety.)

In the preparation of our novel composition-of-matter, polymeric thermosettable ingredients which contribute the necessary acid-functional and acetoacetoxy-type functional pendant moieties are combined, as will be described below in greater detail.

To effect a desired polymerization reaction, it may at certain times be necessary to include a suitable free-radical initiator or mixture of initiators, in our novel composition.

Suitable initiators for this purpose include peracetic acid; hydrogen peroxide; di-tertiary-butyl peroxide ("DTBP"); as well as various percarbonates, persulfates, perphosphates, perborates, and azo compounds.

Suitable azo-type free-radical initiators for purposes of this disclosure include 2,2'-azobisisobutyronitrile ("AIBN"), azobis(alpha, gamma-dimethylcapronitrile), azobisisobutyl nitrile, azobis(alpha-ethylbutyl nitrile), and azobisdimethyl valeronitrile. (See, for example, pages 194–197 and 215–223 of a well-known textbook entitled *Principles of Polymerization*, second edition, by George Odian, published in 1981 by John Wiley & Sons, Inc.)

Among the well-known water-soluble initiators used in emulsion polymerization reactions and which may be mentioned are acetyl peroxide and hydrogen peroxide; hydroperoxides such as tertiary-butyl hydroperoxide; and sodium, potassium, ammonium and barium persulfate.

DETAILED DESCRIPTION OF EXAMPLES

The following examples are set forth to illustrate more clearly, to those skilled in the art, the various principles and practice of our present invention. Yet as such, they are not intended to limit our invention but rather are merely illustrative of certain aspects of the various preferred embodiments. In these various examples, the molecular weights of the polymeric ingredients, prepared as set forth in the below-described examples, were determined via gel-permeation chromatography ("GPC") analytical techniques, using tetrahydrofuran as eluent and poly(styrene) standards. The poly(styrene) standards utilized, presently commercially available from the Dow Chemical Company of Midland, Mich., are more particularly characterized as having number-average molecular weight ("Mn") values of 2,250,000; 1,030,000; 570,000; 156,000; 66,000; 28,500; 9,200; 3,250; and 1,250.

Example 1: Preparation of a Thermosetable Polymeric Resin

Into a 250-milliliter, 3-necked flask equipped with a thermometer, an agitator, a reflux condenser and a nitrogen ("N2") inlet was charged 31.34 grams ("g.") of PM acetate. The three-necked flask was also equipped with a conventional oil-bath heater, and the PM acetate contained within the flask was heated to 162 degrees Celsius ("° C.") via the oil bath, while the flask contents were being agitated. As soon as the PM acetate reached the desired reaction temperature, the reaction mixture of Table I (below) was added dropwise to the three-necked flask over a period of 2 hours, utilizing an addition funnel.

TABLE I

| Polymerization Reaction Mixture Ingredients | | |
|---|---|---|
| Ingredient | Function | Weight, Grams |
| MMA | Optional Monomer | 37.12 |
| AAEM | Acetoacetoxy-Type Monomer | 10.53 |
| BA | Optional Monomer | 9.60 |
| St | Optional Monomer | 9.60 |
| AA | Acid-Functional Monomer | 1.28 |
| DTBP | Free-Radical Initiator | 0.53 |

Immediately following addition of all the Table I ingredients, the reactor contents were maintained at the desired reaction temperature of 162° C. for an additional one (1) hour, while the flask contents were agitated.

The thus-produced polymer was observed to be fairly viscous. Analysis of the polymer via GPC indicated that the number-average molecular weight ("Mn") value was 20139 and that the weight-average molecular weight ("Mw") value was 51080. The Mw/Mn ratio thus was 2.54. Such a polymer is referred to as solution polymerized.

Example 2: Crosslinking Determination of Example 1 Polymer

The solubility in tetrahydrofuran ("THF"), of the thus-prepared solution polymer of Example 1, was utilized as a qualitative determination as to whether the Example 1 polymer was crosslinked or not. The procedures were as follows.

Two (2) different 20-g. mixture samples of the thus-produced Example 1 polymer in its solvent were then collected; and each such 20-g. mixture of polymer and solvent was separately introduced into a 500-milliliter ("ml.") round-bottomed flask. Each such 500-ml. round-bottomed flask was able to be rotated in a manner so as to cause the polymer and solvent mixture, of each such 20-g. sample contained within, to be present as a coating on an inner surface of each such flask. Also, the contents of each such flask were able to be heated and subjected to reduced pressure, while rotating each flask, for purposes of separating the thus-produced polymer from its solvent. In particular, to effect each such separation, flask contents were reduced to 0.3 millimeters ("mm.") of mercury ("Hg.") absolute pressure, while each flask was rotated over a time period of 30 minutes.

When the polymer and solvent, of each such 20-g. sample, were separated in this manner at a temperature of 160° C., the resultant thus-separated polymer was found to be soluble in tetrahydrofuran ("THF"), which means that such a polymer was not crosslinked; but when the polymer and its solvent were separated thusly at a temperature of 200° C., the resultant thus-separated polymer was found to be intractable.

As was mentioned above, one embodiment of our novel composition-of-matter includes a single thermosettable ingredient having both acetoacetoxy-type and acid-functional pendant moieties. Examples 1 and 2 are illustrative.

Also mentioned above as still another embodiment of our present invention is the case where our composition-of-matter includes two or more thermosettable ingredients, one of which includes acid-functional pendant moieties but excludes the acetoacetoxy-type functional pendant moieties, and the other of which includes the acetoacetoxy-type functional pendant moieties but excludes the acid-functional pendant moieties.

In this regard, Example 3 (below) is illustrative of a polymeric thermosettable ingredient which includes acid-functional pendant moieties but excludes acetoacetoxy-type functional pendant moieties; Example 4 (below) is illustrative of a polymeric thermosettable ingredient which includes the acetoacetoxy-type functional pendant moieties but excludes acid-functional pendant moieties; and Example 5 (below) is illustrative of a composition-of-matter which includes both of the polymeric thermosettable ingredients mentioned in connection with Examples 3 and 4.

Example 3: Acetoacetoxy-Type Functional Ingredient Absent

Into the 3-necked flask of Example 1 was charged 35.47 grams of PM acetate (solvent), heated to 162° C., while the flask contents were being agitated.

Upon reaching the desired reaction temperature, the reaction mixture of Table II (below) was added dropwise to the three-necked flask over a period of 2 hours, utilizing an addition funnel.

TABLE II

| Polymerization Reaction Mixture Ingredients | | |
|---|---|---|
| Ingredient | Function | Weight, Grams |
| MMA | Optional Monomer | 37.10 |
| BA | Optional Monomer | 9.60 |
| St | Optional Monomer | 9.60 |
| HEMA | Optional Monomer | 6.40 |
| AA | Acid-Functional Monomer | 1.28 |
| DTBP | Free-Radical Initiator | 0.53 |

Immediately following addition of all of the Table II ingredients, the reactor contents were maintained at the desired reaction temperature of 162° C. for an additional one (1) hour, still agitating the flask contents.

Analysis of the thus-produced polymer via GPC indicated that the Mn value was 14814 and that the Mw value was 53770. The Mw/Mn ratio thus was 3.63.

A 20-g. sample mixture of the thus-produced polymer and solvent was then introduced into a 250-ml. round-bottomed flask, for purposes of separating the polymer and solvent, at 0.25 millimeters of mercury ("mm. Hg.") absolute pressure and at a temperature of 232° C., over a time period of 30 minutes, using separation principles outlined in Example 2. The thus-separated polymer was found to be soluble in THF.

Example 4: Acid-Functional Ingredient Absent

Into a 100-gram (capacity) pressurizable polymerization reactor equipped with a thermometer, an oil bath heater, and an agitator was charged 31.75 grams of PM acetate (solvent), heated to the desired reaction temperature of 162° C., while the reactor contents were agitated.

As soon as the reactor contents reached the desired reaction temperature and stabilized at such a temperature, the reaction mixture of Table III (below) was added dropwise to the pressurizable reactor over a time period of about 2.8 hours, while the reactor contents were maintained at 100 psig. The 100-gram pressurizable reactor was also equipped with an $N_2$ inlet for maintaining an inert gas condition within the reactor's headspace.

TABLE III

| Polymerization Reaction Mixture Ingredients | | |
|---|---|---|
| Ingredient | Function | Weight, Grams |
| MMA | Optional Monomer | 37.60 |
| AAEM | Acetoacetoxy-Type Monomer | 10.67 |
| BA | Optional Monomer | 9.72 |
| St | Optional Monomer | 9.72 |
| DTBP | Free-Radical Initiator | .54 |

Immediately following addition of all of the Table III ingredients, the reactor contents were maintained at the desired reaction temperature for an additional one (1) hour, with continued agitation of the reactor contents.

Analysis of the resulting polymer via GPC indicated that the Mn value was 23545 and that the Mw value was 70570. The Mw/Mn ratio thus was 3.

The above-mentioned 500-milliliter round-bottomed flask was utilized to effect the solvent separation procedures set forth in Example 2 (above), and results of such separation are summarized in Table IV, below.

TABLE IV

| | Separation Summary | | |
|---|---|---|---|
| Vacuum | Sep'n Time | Sep'n Temp. | Results |
| .025 mm. Hg. | 30 min. | 160° C. | Sol. in THF |
| .025 mm. Hg. | 30 min. | 230–260° C. | Sol. in THF |

Example 5: Crosslinking of Example 3 and 4 Polymers

Ten (10) grams of Example 3 polymer and ten (10) grams of Example 4 polymer were combined with ten (10) grams of xylene in a mixing vessel of suitable size to produce a mixture.

The mixture was then introduced into a 250-ml. round-bottomed flask. Such a flask was able to be rotated in a manner so as to cause the polymer-and-solvent mixture to be present as a coating on the inner surface of the flask.

The contents of the flask were heated to a temperature of 230° C. under a reduced pressure of 0.3 mm. Hg., for thirty (30) minutes. The resultant polymer was found to be insoluble in THF.

Example 6: Preparation of Another Thermosettable Resin

Into the 3-necked flask of Example 1 was charged 31.47 grams of PM acetate, heated to 160° C. via the above-mentioned oil bath, while the flask contents were agitated. Upon the flask contents reaching the desired reaction temperature, the reaction mixture of Table V (below) was added dropwise to the three-necked flask over a time period of one (1) hour and fifteen (15) minutes, utilizing an addition funnel.

Analysis of the thus-produced polymer via GPC indicated that the Mn value was 4874 and that the Mw value was 10436. The Mw/Mn ratio thus was 2.14.

TABLE V

| Polymerization Reaction Mixture Ingredients | | |
|---|---|---|
| Ingredient | Function | Weight, Grams |
| St | Optional Monomer | 31.24 |
| AAEM | Acetoacetoxy-Type Monomer | 21.42 |
| AA | Acid-Functional Monomer | 2.60 |
| DTBP | Free-Radical Initiator | 1.47 |

Immediately thereafter, and while the reaction flask was still warm, a 15-g. sample of the thus-produced polymer and reaction solvent mixture was then introduced into the 250-ml. round-bottomed flask (mentioned above in connection with Example 2), for purposes of separating the polymer and solvent, at 0.2 mm. Hg. absolute pressure and at a temperature of 232° C., for thirty (30) minutes, utilizing procedures set forth in Example 2. The thus-separated polymer was found to be substantially *insoluble* in THF.

Thereafter, some of the polymer (and some of its reaction solvent) were introduced into the 250-ml. round-bottomed flask (mentioned above), at 0.3 mm. Hg. absolute pressure and at a temperature of 160° C. for 30 minutes, for purposes of separating a quantity of the thus-produced polymer from its reaction solvent. The thus-separated polymer, this time, was found to be soluble in THF.

Example 7: Yet Another Thermosettable Polymeric Resin

In this example, larger-sized commercially-available processing equipment was utilized to prepare a greater quantity of thermosettable polymeric resin, representative of our present invention.

The reaction vessel, a 500-ml. pressurizable continuous stirred tank reactor (called a "CSTR"), was equipped with a thermometer, an agitator, a "feed" tank, two "receivers", a "scrap" tank, and a nitrogen ("$N_2$") inlet for purposes of maintaining an inert gas condition within the headspace of the reaction vessel.

The reaction vessel was additionally equipped with an oil bath heater. The reaction vessel was filled with PM acetate, the reaction solvent. The reaction vessel and the solvent were heated to a temperature of 162° C., utilizing the oil bath, while the reaction vessel contents were agitated.

Meanwhile, the various ingredients of Table VI (below) were separately introduced into the "feed" tank, also equipped with an agitator; and the Table VI ingredients in the feed tank were then mixed, using the feed tank agitator, to thereby produce a polymerizable mixture.

TABLE VI

| Polymerization Reaction Mixture Ingredients | | |
|---|---|---|
| Ingredient | Function | Weight, Grams |
| MMA | Optional Monomer | 1113.6 |
| PM Acetate | Solvent | 940.2 |
| AAEM | Acetoacetoxy-Type Monomer | 315.9 |
| BA | Optional Monomer | 288.0 |
| St | Optional Monomer | 288.0 |
| AA | Acid-Functional Monomer | 38.4 |
| DTBP | Free-Radical Initiator | 15.9 |

In operation, the Table VI ingredients in the feed tank were fed to the CSTR, displacing the solvent already in the reaction vessel. Thus, the solvent-containing mixture of Table VI was fed to the CSTR at a rate of 16.7 grams per minute ("g./min.") while the contents of the CSTR were being maintained at a reaction temperature of 324° F. (ca. 162° C.) at a pressure of 100 pounds per square inch gauge pressure ("psig"). During this period of time, the "scrap" tank received that solvent (originally charged into the CSTR) which was being displaced from the CSTR via addition of the Table VI ingredients.

After 1500 grams of the reaction mixture of Table VI had been fed to the CSTR, flow from the CSTR to the "scrap" tank was stopped and CSTR contents were caused to flow from the CSTR to receiver No. 1, for purposes of collecting in receiver No. 1 some of the polymeric reaction product and solvent from the CSTR.

After 2450 grams of the reaction mixture of Table VI had been fed to the CSTR, the remainder of the polymeric reaction product and solvent was collected in receiver No. 2.

Thereafter, a vacuum of 20 inches ("in.") of mercury ("Hg.") was pulled on receiver No. 2, along with a fine flow of $N_2$. About 300 grams of a "high solids" product containing some residual solvent but mostly the thus-produced polymer was accordingly collected.

Analysis of the polymer within receiver No. 1 via GPC indicated that the number-average molecular weight ("Mn") value was 11336 and that the weight-average molecular weight ("Mw") value was 21646. The Mw/Mn ratio thus was 1.91.

Analysis of the polymer within receiver No. 2 indicated that the Mn value was 9589, that the Mw value was 19182, and that the Mw/Mn ratio thus was 2.

Separate samples of the polymer and reaction solvent mixtures, of each of receivers Nos. 1 and 2, were then introduced into the 500-ml. round-bottomed flask (mentioned in connection with Example 2 above), for purposes of separating each thus-produced polymer from its reaction solvent. Maintaining the vacuum conditions of Example 2, separation at 160° C. resulted in no crosslinking, but separation at 200° C. resulted in crosslinking, with respect to those polymers collected in receivers Nos. 1 and 2.

Example 8: Still Another Thermosettable Polymeric Resin

This example illustrates that a polymer having an Mw/Mn ratio in excess of 11 can be within the scope of our present invention. Such a polymeric resin was produced as follows.

Into the 3-necked flask of Example 1 was charged 31.34 grams of PM acetate, heated to 162° C. using the oil bath, while the flask contents were agitated. Upon the flask contents reaching the desired reaction temperature, the reaction mixture of Table VII (below) was added dropwise to the three-necked flask over a time period of two (2) hours and fifty (50) minutes, utilizing an addition funnel.

TABLE VII

| Polymerization Reaction Mixture Ingredients | | |
|---|---|---|
| Ingredient | Function | Weight, Grams |
| MMA | Optional Monomer | 34.87 |
| AAEM | Acetoacetoxy-Type Monomer | 10.53 |
| BA | Optional Monomer | 9.60 |
| St | Optional Monomer | 9.60 |
| AA | Acid-Functional Monomer | 3.53 |
| DTBP | Free-Radical Initiator | .53 |

Immediately following addition of all of the Table VII ingredients, the reactor contents were maintained at the desired reaction temperature of 162° C. for an additional one (1) hour, with continued agitation of the reactor contents.

Two (2) different sample mixtures of the thus-produced polymer and solvent were then collected; and each such mixture of polymer and solvent was separately introduced into the 500-milliliter ("ml.") round-bottomed flask mentioned above in connection with Example 2.

Analysis of the polymer via GPC indicated that the number-average molecular weight ("Mn") value was 14985 and that the weight-average molecular weight ("Mw") was 168367. The Mw/Mn ratio thus was 11.2.

When the polymer and solvent, of each such sample, were separated in accordance with the Example 2 procedures, at a temperature of 160° C., the polymer was found to be soluble in tetrahydrofuran ("THF"), meaning that the polymer was not crosslinked; but when the polymer and solvent were separated at a temperature of 235°-250° C., the resultant polymer was found to be intractable.

Example 9C: A Low Molecular Weight Polymeric Resin

Our present findings suggest that certain relatively low molecular weight resins may be outside the scope of our present invention. In this regard, examples reported herein which include the letter "C" immediately following the example number are being reported for "comparative" purposes only, as such are presently believed to be outside the scope of our invention. Thus, Example 9C is illustrative of a certain, relatively low molecular weight resin that is presently believed to be outside the scope of our invention. That resin was produced as follows.

Into a 600-gram (capacity) reaction vessel was charged 94.02 grams of PM acetate (solvent), heated to 200° C. via an oil bath, while the reactor contents were agitated. The solvent was intentionally heated to a relatively greater reaction temperature (i.e., 200° C.), for purposes of obtaining a relatively lower molecular weight polymer product. The 600-gram reactor was pressurized to 180–200 psig., while the reactor headspace was filled with $N_2$ inert gas. Upon reaching the desired reaction temperature, the reaction mixture of Table VIII (below) was pumped into the pressurized reactor over a period of one (1) hour and twenty-five (25) minutes, with continued agitation of the reactor contents and while the reactor contents were maintained at the desired reaction temperature.

TABLE VIII

| Polymerization Reaction Mixture Ingredients | | |
|---|---|---|
| Ingredient | Function | Weight, Grams |
| MMA | Optional Monomer | 111.36 |
| BA | Optional Monomer | 28.80 |
| St | Optional Monomer | 28.80 |
| AAEM | Acetoacetoxy-Type Monomer | 15.80 |
| HEMA | Optional Monomer | 15.80 |
| AA | Acid-Functional Monomer | 3.84 |
| DTBP | Free-Radical Initiator | 1.59 |

Immediately following addition of all the Table VIII ingredients, the reactor contents were maintained at the desired reaction temperature of 200° C. for an additional seventy-two (72) minutes via the oil bath heater, with continued agitation of the reactor contents.

Analysis of the polymer via GPC indicated that the number-average molecular weight ("Mn") value was 1706 and that the weight-average molecular weight ("Mw") value was 10703. The Mw/Mn ratio thus was 6.27.

Two (2) different sample mixtures, consisting of the thus-produced polymer and solvent mixture were then collected; and each such mixture of polymer and solvent was separately introduced into its own 500-milliliter ("ml.") round-bottomed flask, utilizing separation procedures mentioned above in connection with Example 2.

When the polymer and solvent of each such sample mixture were separated at a temperature of 160° C., the polymer was found to be soluble in tetrahydrofuran ("THF"); and—surprisingly—when the polymer and solvent were separated at a temperature of 240° C., the resultant polymer was still found to be soluble in THF.

Example 10C: Another Low Molecular Weight Resin

Similar to Example 9C, Example 10C is illustrative of another low molecular weight resin that is presently believed to be outside the scope of our invention. Such a resin was produced as follows.

Into the 600-gram (capacity) reaction vessel of Example 9C was charged 94.02 grams of PM acetate (solvent), again heated to 200° C. utilizing an oil bath, while the reactor contents were agitated. The 600-gram reactor was pressurized to 100 psig., while the reactor headspace was filled with $N_2$ inert gas. Upon the reactor contents reaching the desired reaction temperature, the reaction mixture of Table IX (below) was pumped into the pressurized reactor over a time period of one (1) hour, with continued agitation of the reactor contents.

TABLE IX

| Polymerization Reaction Mixture Ingredients | | |
|---|---|---|
| Ingredient | Function | Weight, Grams |
| MMA | Optional Monomer | 111.36 |
| AAEM | Acetoacetoxy-Type Monomer | 31.60 |
| BA | Optional Monomer | 28.80 |
| St | Optional Monomer | 28.80 |
| AA | Acid-Functional Monomer | 3.84 |
| DTBP | Free-Radical Initiator | 1.59 |

Immediately following addition of all the Table IX ingredients, the reactor contents were maintained at the desired reaction temperature of 200° C. for an additional one (1) hour, with continued agitation of the reactor contents.

Analysis of the polymer via GPC indicated that the number-average molecular weight ("Mn") value was 1654 and that the weight-average molecular weight ("Mw") value was 9555. The Mw/Mn ratio thus was 5.78.

Two (2) different sample mixtures, consisting of the thus-produced polymer and solvent were collected; and each such mixture of polymer and solvent was separately introduced into its own 500-ml. round-bottomed flask, utilizing separation procedures mentioned above in connection with Example 2.

When the polymer and solvent of each such sample mixture were separated at a temperature of 160° C., the polymer was found to be soluble in tetrahydrofuran ("THF"); and—again, surprisingly—when the polymer and solvent were separated at a temperature of 250° C., the resultant polymer was again still found to be soluble in THF.

Example 11: Polymeric Emulsion

This example illustrates the synthesis of a polymeric latex containing at least three acetoacetoxy-type pendant moieties as well as at least three acid-functional pendant moieties. Such a polymeric latex was prepared as follows.

Into a 2-liter 4-necked flask equipped with a mechanical agitator, a heating mantle, an $N_2$-inlet and outlet, a thermometer, and a reflux condenser was charged a mixture consisting of 885.02 grams of de-ionized ("D.I.") water, 15.82 grams of "Abex JKB" (brand) surfactant and 23.55 grams of "Gemtex 691-40" (brand) surfactant. The flask-charged mixture, under a nitrogen blanket, was accordingly heated to 80° C.±1° C. utilizing the heating mantle while the flask contents were subjected to agitation. When the temperature of the flask contents reached 80° C., 3.5 grams of ammonium persulfate (initiator) in 10 grams of water was immediately added.

Two minute thereafter, the monomer mixture of Table X (below) was slowly added to the flask contents over a time period of one (1) hour, using a conventional feed pump. The temperature of the reactor contents was maintained at 80° C.±1° C. during the period of monomer feed addition, and for an additional hour following completion of the monomer feed. Thereafter, the resulting polymeric latex was then cooled to room temperature, and subsequently filtered using cheesecloth.

TABLE X

| Monomer Mixture | | |
|---|---|---|
| Ingredient | Function | Weight, Grams |
| MMA | Optional Monomer | 180.18 |
| AAEM | Acetoacetoxy-Type Monomer | 115.15 |
| St | Optional Monomer | 115.15 |
| MAA | Acid-Type Monomer | 50.82 |

Analysis of the polymer via GPC indicated that the Mn value was 47900 and that the Mw value was 137700. The Mw/Mn ratio thus was 2.87.

Example 12: Water-Borne Coating Formulation

A water-borne thermosettable coating formulation was prepared by simply combining the ingredients of Table XI (below), thereby producing an aqueous mixture.

TABLE XI

| Water-Borne Thermosettable Formulation | | |
|---|---|---|
| Ingredient | Function | Weight, Grams |
| Ex. 10 Emulsion | Thermosettable Latex | 57.14 |
| D.I. Water | Liquid Carrier | 25.65 |
| DPM | Coalescent | 15.50 |
| KP-140 | Plasticizer | 1.11 |
| FSC | Leveling Aid | 0.60 |

De-ionized ("D.I.") water served as the volatile liquid carrier. "DPM" (brand) coalescent is commercially available from Dow Chemical Company of Midland, Mich. "KP-140" (brand) plasticizer is commercially available from RhonePoulenc of Shelton, Conn. "FSC" (brand) leveling aid, a one (1) weight percent solution, is commercially available from E. I. DuPont de Nemours Company of Wilmington, Del.

The mixture of Table XI was then applied to an aluminum panel, allowed to dry at room temperature, and thereafter heated to 200° C. for 30 minutes. The resultant polymeric coating was found to be insoluble in THF and acetone.

Example 13: Powder Coating Formulation

Into the 3-necked flask of Example 1 was charged thirty (30) grams of PM acetate (solvent), heated to 140° C., while the flask contents were being agitated. Upon reaching the desired polymerization reaction temperature, the reaction mixture of Table XII (below) was added dropwise to the three-necked flask over a time period of ninety (90) minutes, utilizing an addition funnel.

TABLE XII

| Polymerization Reaction Mixture Ingredients | | |
|---|---|---|
| Ingredient | Function | Weight, Grams |
| MMA | Optional Monomer | 32.00 |
| BA | Optional Monomer | 13.00 |
| St | Optional Monomer | 10.00 |
| AAEM | Acetoacetoxy-Type Monomer | 9.00 |
| AA | Acid-Functional Monomer | 6.00 |
| DTBP | Free-Radical Initiator | 0.23 |

Immediately following the addition of all of the Table XII ingredients, the reactor contents were maintained at the desired reaction temperature for an additional ninety (90) minutes, with continued agitation of the reactor contents.

The resulting polymer was thereafter separated from its PM acetate solvent, using a commercial wipe-film type evaporator, at 145° to 150° C. under reduced pressure.

The thus separated polymer was thereafter re-dissolved in acetone, precipitated in methanol, thereafter dried, and subsequently ground to a powder in a commercial blender.

The resultant powder was then applied electrostatically to a steel plate, and the plate was then heated to a temperature of 230° C. for a time period of thirty (30) minutes. The resultant coating was found to be insoluble in THF and acetone.

A novel polymeric thermosettable composition-of-matter has thus been described. Also described hereinabove are various methods of making the novel polymeric thermosettable composition-of-matter, as well as various methods of utilizing the novel polymeric thermosettable composition-of-matter, to produce desired crosslinked surface coatings and films on various substrates.

While these various aspects of our invention have been described with reference to certain preferred embodiments and illustrative examples, it is to be understood that the scope of our present invention is not to be limited to such embodiments and examples. On the contrary, a variety of alternative embodiments will become apparent to those skilled in the art upon reading the foregoing description; and such are to be considered as forming a part of our invention insofar as they fall within the spirit and scope of the appended claims.

For example, as mentioned above, our present findings suggest that certain low molecular weight resins may be outside the scope of our invention. In that regard, Examples 9C and 10C were presented for "comparative" purposes only, as such polymeric materials are presently believed to be outside the scope of our invention.

Further in that regard, and as was also mentioned (above), our present belief, with respect to that embodiment of our present invention wherein the polymeric thermosettable ingredient has both acetoacetoxy-type functional pendant moieties as well as acid-functional pendant moieties, is that such a polymeric material will have a number-average molecular weight ("Mn") of more than 1750, preferably more than 3000, more preferably more than 3500, and most preferably more than 4000.

We thus genuinely believe that such a polymeric material having an Mn value of e.g. 1750 to 2000 can be utilized to make a thermosettable composition-of-matter, embodying principles of our invention, when such a polymeric material includes relative quantities or concentrations of both acetoacetoxy-type functional pendant moieties as well as acid-functional pendant moieties, sufficient in number for purposes of obtaining a thermoset (i.e., crosslinked) polymeric network, when such a polymeric material or ingredient is subjected to elevated-temperature conditions for a predetermined period of time.

That which is claimed as invention includes the following:

1. A polymeric thermosettable composition comprising:
   a first polymeric thermosettable ingredient characterized as having an average of at least three acetoacetoxy functional pendant moieties per polymer molecule formed from an acetoacetoxy group containing monomer represented by the structure

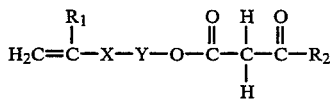

wherein $R_1$ is either H or is a $C_1$ to $C_{10}$ alkyl group;
wherein $R_2$ is a $C_1$ to $C_{10}$ alkyl group;
wherein X is either non-existent or is

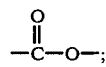

wherein Y is either non-existent or a divalent aromatic group, or is a divalent aliphatic cyclic group, or is $-(CH_2)_j-$ and j is an integer of from 1 to 10, inclusive, or is $-(CH_2-CHR_1-O)_m-CH_2-CHR_1-$ wherein Y is existent when X

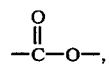

and m is either zero or is an integer of from 1 to 9, inclusive; and a second polymeric thermosettable ingredient characterized as having an average of at least three acid-functional pendant moieties per polymer molecule, wherein the acid-functional and the acetoacetoxy functional pendant moieties are characterized as reacting to form a thermoset composition through crosslinking at a temperature of at least 180° C.

2. The composition of claim 1 wherein the first polymeric thermosettable ingredient is formed from acetoacetoxyethyl methacrylate and wherein the second thermosettable polymer ingredient is formed from acid monomers selected from the group consisting of acrylic acid, methacrylic acid and mixtures thereof.

3. The composition of claim 2 wherein the first polymeric thermosettable ingredient is a copolymer of acetoacetoxyethyl methacrylate and at least one vinyl monomer addition polymerizable with acetoacetoxyethyl methacrylate and wherein the second thermosettable polymer ingredient is formed from acrylic acid.

4. The composition of claim 1 wherein the first polymeric thermosettable ingredient is formed from an acetoacetoxy group containing monomer and at least one monomer that is addition polymerizable with the acetoacetoxy group containing monomer selected from the group consisting of an acrylic acid ester, a methacrylic acid ester, a monomeric alkene, and a vinylic monomer.

* * * * *